United States Patent [19]

Seeman et al.

[11] 4,315,486
[45] Feb. 16, 1982

[54] FLOATING RADIANT TUBE SHEETS FOR VERTICAL TUBE REFORMERS AND THE LIKE

[75] Inventors: Howard H. Seeman, Seaford, N.Y.; Robert F. Kaupp, Willow Grove, Pa.

[73] Assignee: Selas Corporation of America, Dresher, Pa.

[21] Appl. No.: 173,834

[22] Filed: Jul. 30, 1980

[51] Int. Cl.³ .................. F22B 37/24; F22B 17/02; F28F 7/00
[52] U.S. Cl. .................................. 122/510; 165/81; 432/208; 432/244
[58] Field of Search ............... 432/208, 244; 122/510, 122/512; 165/81, 178

[56] References Cited

U.S. PATENT DOCUMENTS

| | | | |
|---|---|---|---|
| 2,344,269 | 3/1944 | Saco, Jr. | 22/512 X |
| 3,385,271 | 5/1968 | Fleischer | 122/510 |
| 3,696,862 | 10/1972 | Dijk | 165/178 |

Primary Examiner—John J. Camby

Attorney, Agent, or Firm—Austin R. Miller

[57] ABSTRACT

Floatable tube sheets are provided for use in a reformer furnace or the like wherein a plurality of vertically oriented catalyst tubes are disposed in the fire box with the upper tube ends extending through the fire box roof. The tube sheets are located proximate apertures or channels in the roof through which the upper tube ends protrude and provide a seal to substantially minimize air leakage through the roof. At the same time, the tube sheet plates permit vertical expansion and contraction of the tubes. The tube sheet plates themselves are moveably mounted to the roof so that they can float vertically upwardly and downwardly through a limited distance so as to compensate for tube movement in those instances in which the tubes become bent or bowed during operation. At least a pair of contiguous tube sheet plates surround each tube to facilitate easy tube sheet removal without resulting in attendant removal of any neighboring tubes or, in some instances, furnace shutoff.

17 Claims, 7 Drawing Figures

FLOATING RADIANT TUBE SHEETS FOR VERTICAL TUBE REFORMERS AND THE LIKE

BACKGROUND OF THE INVENTION

1. Field of the Invention

The present invention relates to improved sealing structure for mounting vertically oriented tubes in a furnace roof. Specifically, the invention pertains to a floating plate design which aids in sealing the roof in a catalyst reformer, while allowing vertical expansion and contraction of the individual vertically oriented catalyst tubes. At the same time, if the catalyst tubes become bent or bowed during operation, the plates themselves are moveable upwardly and downwardly, within limits, in unison with the tubes to compensate for the upward and downward movement of the bent or bowed tubes caused by thermal expansion or contraction.

2. Prior Art

Pyrolysis furnaces and the like are known wherein a plurality of vertically oriented tubes extend through the roof of the fire box, with the side walls of the fire box being provided with radiant cup burners or the like to provide the desired temperature and gradient of heat needed for the material which flows through the tubes. U.S. Pat. Nos. 3,361,118 (Breckenridge et al); 3,062,197 (Fleischer); 3,656,913 (Blaha et al); and 3,672,847 (Esselink), all of common assignment herewith, disclose such structure. Although certain of these references may concern temperature gradation structure and design, it is to be understood that the present invention may be used with other burner configurations.

In certain of these prior art devices, the upper tube end portions, proximate the openings or channels in the roof, are supported by a stationary collar or similar device which acts to seal the furnace roof while permitting a certain degree of vertical upward and downward tube movement caused by thermal expansion or contraction.

In other prior art furnaces, the tubes are mounted in stationary, elongated tube sheet plates which may extend the entire length of the fire box. Commonly, these tube sheet plates are provided with a sufficient number of apertures therein to accommodate six or more catalyst tubes. If the tubes bend or bow during operation, these stationary tube sheet plates bind to the tubes and often crack or break, destroying the insulation and air leakage restriction to the fire box. In these instances, repair of the damaged tube sheet plates is not only expensive, but time consuming as well, since all of the neighboring tubes and support mechanisms associated with the tube sheet plate must be removed. Accordingly, with these prior art tube sheet plates, repair or replacement thereof can only be achieved if the furnace is shut down.

Accordingly, despite the efforts of the prior art, there remains a need for the provision of a tube sheet plate sealing structure which readily accommodates vertical upward and downward movement of the tubes even when they are bent or bowed.

Moreover, there remains a need for a tube sheet plate sealing structure which is readily repaired or replaced with minimal effort and without need for removal of neighboring tubes and/or tube supporting structure.

These and other objects are met by the present invention. The various features of novelty which characterize this invention are pointed out with particularly in the claims annexed to and forming a part of the specification. For a better understanding of the invention, its advantages and the specific objects attained with its use, reference should be had to the accompanying drawings and descriptive matter in which a preferred embodiment of the invention is illustrated and described.

IN THE DRAWINGS

FIG. 3(*a*) is a front end view of the tube sheet bracket shown in FIG. 3;

DETAILED DESCRIPTION

Figures 1, 2, 3, 3A:
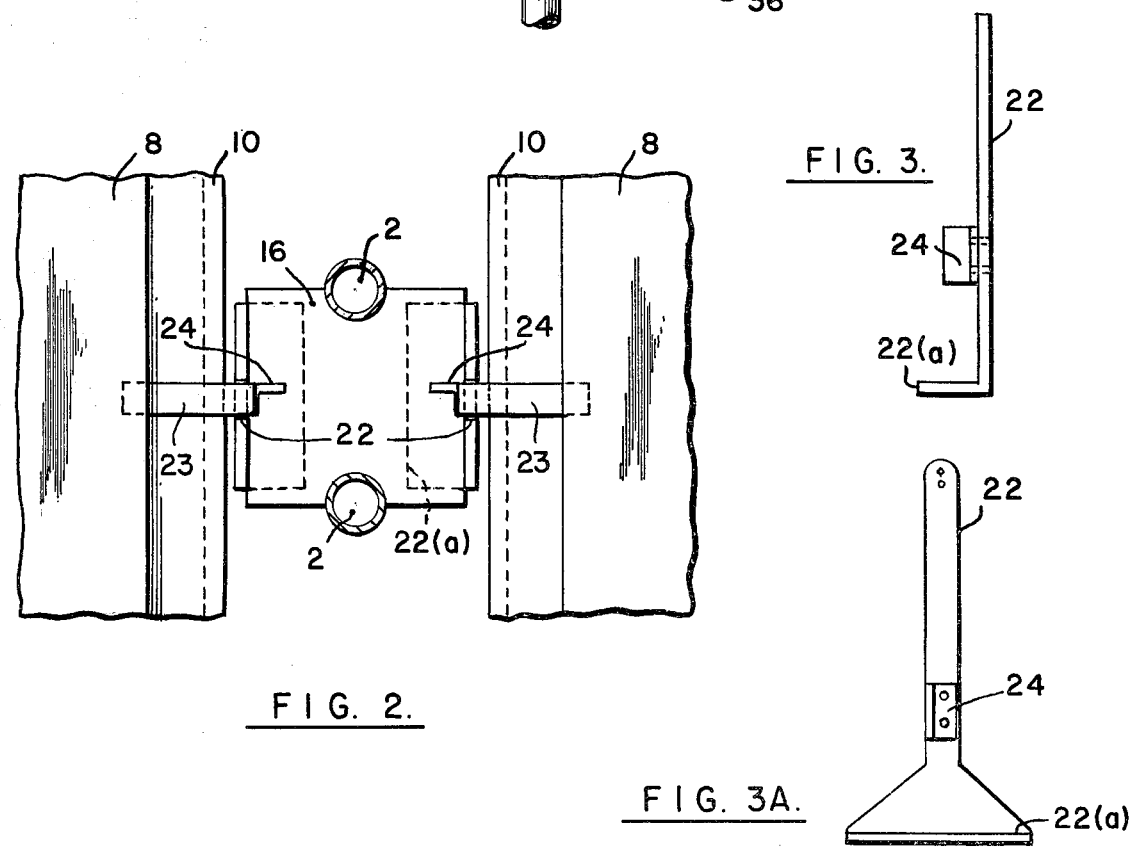
FIG. 1 is a side sectional view of one embodiment of the present invention.
FIG. 2 is a plan view of the embodiment shown in FIG. 1, with certain parts being omitted to facilitate clearer understanding of the invention.
FIG. 3 is a side view of the tube sheet bracket shown in FIG. 1.
Figure 5:
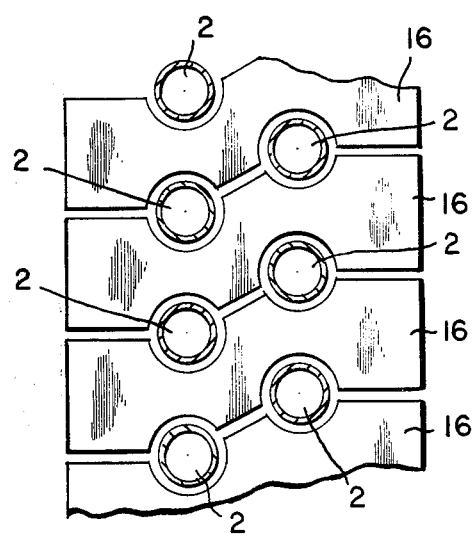
FIG. 5 is a diagrammatic top view, with certain parts being omitted to facilitate understanding of the invention, of one embodiment of the invention, showing a staggered or zig-zag arrangement of the catalyst tubes.

With reference to the drawings, and specifically to FIG. 1 thereof, there is shown a fire box 36 of a furnace constructed in accordance with ordinary furnace practice which includes side wall members (not shown) and a floor (not shown). This furnace may be heated to reacting temperatures by a series of rows of radiant type burners (not shown) disposed in the furnace side walls, with the products of combustion being withdrawn from the furnace chamber through a conventional exhaust opening to a stack (not shown), or the heating means may be centrally disposed (facing radially outwardly) in a circular cross-sectioned furnace configuration (not shown). As shown, catalyst tube 2 extends vertically through the furnace roof structure. The furnace roof comprises platform grating 8, spaced from arch insulation 14 by means of penthouse floor framing 10. It is to be understood that the catalyst tubes 2 may be mounted vertically in a row through the furnace substantially midway between the side walls in which the burners may be located. The catalyst tubes 2 may be mounted in in-line fashion as shown in FIG. 2, or they may be mounted in staggered, zig-zag fashion as shown in FIG. 5.

Again, turning to FIG. 1 of the drawings, there is shown tube 4, through which the desired reactants may be introduced to the catalyst tube 2. It is to be understood that the number of catalyst tubes 2 utilized will depend upon the size of the installation. Typically, methane, usually in the form of natural gas, and stream are admitted into catalyst tube 2 via inlet connecting tube 4. The catalyst tube 2 itself, may be packed with a catalyst, usually nickel oxide in particle form, as disclosed in U.S. Pat. No. 3,656,913 (Blaha et al), the disclosure of which is hereby incorporated by reference. At the upward end portion of catalyst tube 4, there are provided lugs 6, which typically provide connection between a counter weight or the like and the catalyst tube 2 so as to provide an vertically directed biasing force on the catalyst tube 2 to compensate for thermal expansion and contraction of the tube 2.

It is noted that the arch insulation 14, which is disposed underneath the roof plate 12, is formed of suitable refractory material, so as to withstand the high temperature conditions existing within fire box 36 during normal usage. Depending from platform grating 8 are tube sheet support brackets 22 connected to support members 23. The lower portion of tube sheet support bracket 22 comprises a flange 22 (a) which serves as a mounting structure upon which tube sheet 16 rests. Overlying tube sheet 16, in FIG. 1, are layers 18 and 20 of fibrous insulation. Basically, the insulation is cut to the same contour as tube sheet 16, but is slightly greater in its overall width and length dimensions to assure its contact with the insulation on the adjoining tube sheets and roof channels that form the fire box opening for the catalyst tubes 2. The insulation is also cut to assure its direct contact with the tubes 2. The insulation layers will be a minimum of four inches in thickness in relatively hot fire box designs, wherein temperatures of up to 2,150° F. are common. When temperatures of below about 1,850° F. are maintained within the fire box, thinner insulating layers 18 and 20 may be provided.

As shown, the blankets 18, 20, are retained by hold down clip members 26 that are adapted to slide up and down the tube sheet support bracket 22. Limit lugs 24 are formed on the tube sheet support brackets 22, and limit the vertically upward movement of the tube sheet 16, which may occur if the catalyst tube becomes bent or bowed during operation.

Accordingly, it is apparent, from FIG. 1, that the tube sheet 16 provides a seal to prevent communication between ambient conditions and those existing within fire box 36. However, vertically upward and downward movement of the catalyst tube 2 is permitted, due to the dimensioning of the apertures in the tube sheet 16, through which the catalyst tube 2 extends. At the same time, however, if the tube 2 becomes bent or bowed during operation, the tube sheet 16 and fibrous insulating layers 18 and 20, may move vertically upwardly and downwardly, to a limited extent, to compensate for upward and downward movement of the bowed or bent tubes 2.

Turning attention now to FIG. 2, there is shown an in-line arrangement of catalyst tubes 2. Here, the channel existing between the opposed platform grating members 8, can clearly be seen. In this Figure, the insulating layers 18 and 20 have been removed for clearer understanding of the invention. It is to be noted here that if tube sheet 16 is to be removed or replaced, the operator can simply tilt the tube sheet 16 to a vertical inclination, remove same, and replace it with a new tube sheet 16. This is in sharp contrast to many of the prior art devices wherein neighboring tubes 2, and supporting structure therefor, would have to be removed prior to repair or replacement of tube sheet 16. Further, in those instances wherein insulation is provided only on the roof side of tube sheet 16, such as in FIGS. 1, 2 and 6, the tube sheet 16 may be repaired and/or replaced even when the furnace is operating.

Turning consideration now to FIGS. 3 and 3 (a), there is shown the tube sheet support bracket 22, utilized in the present invention. The bracket 22 has a substantially "L" shaped cross section as shown in FIG. 3, with limit lug 24 protruding from the longer leg of the "L." Flange 22 (a) is provided at the lower end of tube sheet support bracket 22 and provides a mounting structure upon which tube sheet 16 rests.

Figure 4:
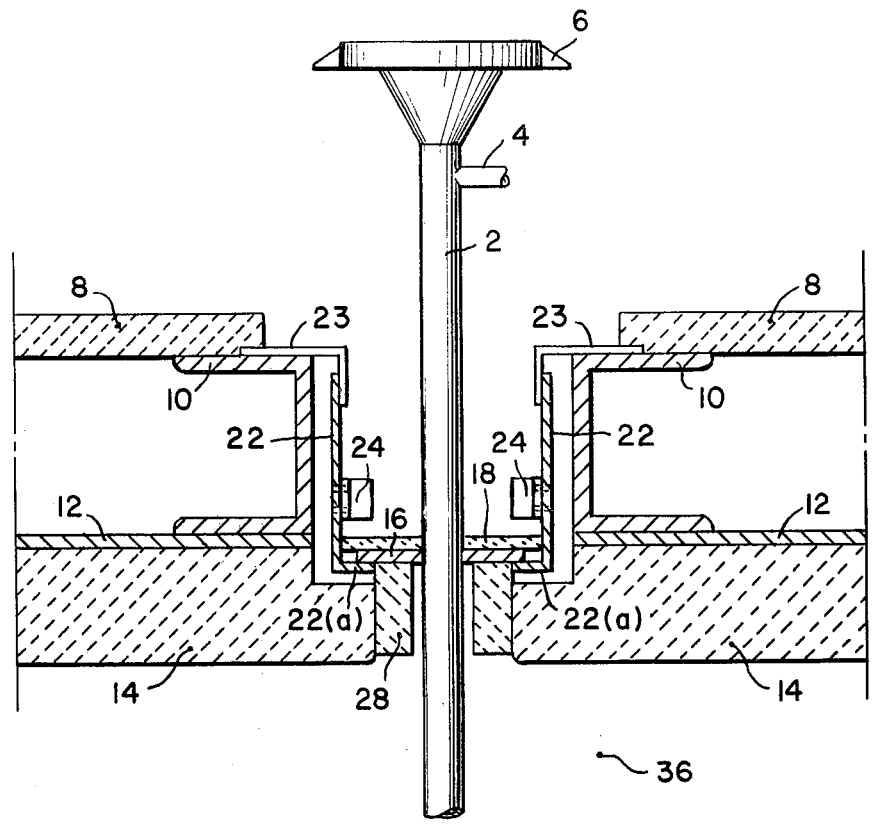
FIG. 4 is a side sectional view of another embodiment of the invention.

In FIG. 4, another embodiment is shown wherein insulation 28 is provided underneath the tube sheet 16, and fibrous insulation layer 18 provided above tube sheet 16.

In FIG. 5, a staggered or zig-zag arrangement of the catalyst tubes 2 is shown in combination with a suitable arrangement for tube sheets 16. Here, it can be seen that each catalyst tube 2 is surrounded by a pair of contiguous tube sheets 16, which together, in combination with accompanying insulation and the like, substantially minimize air leakage through the roof openings or channels. In this Figure, it can be seen that the tube sheet 16 can be easily replaced by first vertically inclining one tube sheet 16 and removing same, without attendant removal of neighboring catalyst tubes 2 and/or their supporting structure.

Figure 6:
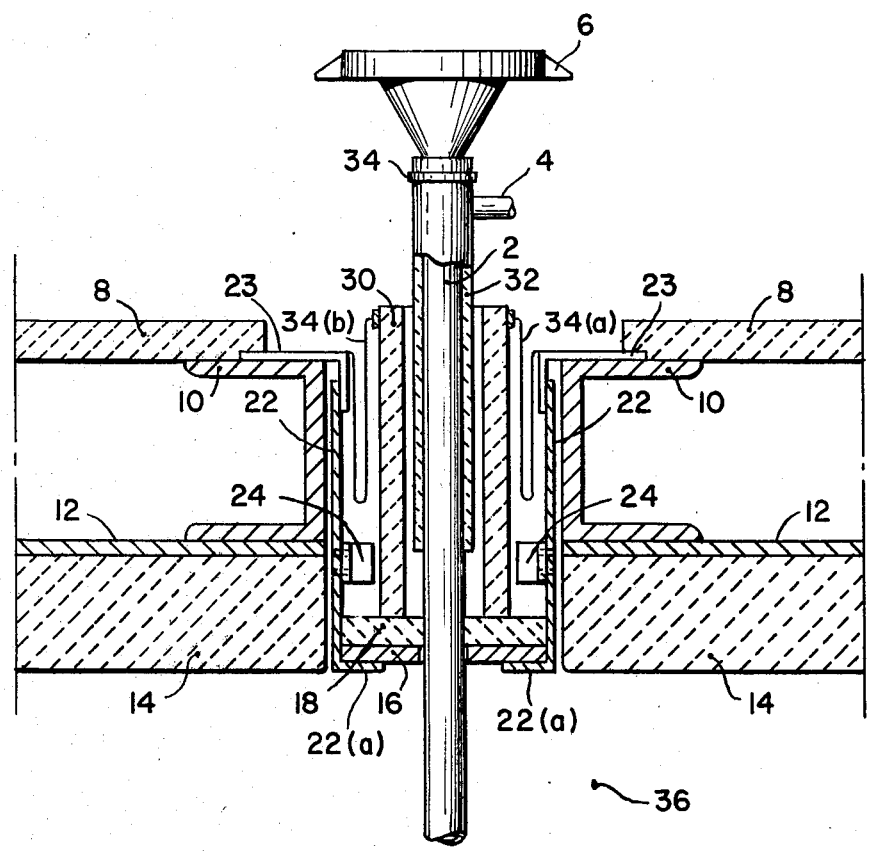
FIG. 6 is a side sectional view of a preferred embodiment of the invention.

In FIG. 6, there is shown a preferred embodiment of the present invention. Here, catalyst tube 2 is surrounded by an insulating sleeve 30. Further, an inner annular layer of insulation 32, is wrapped about the tube 2 and retained on the tube via band 34. Sleeve 30 is connected to the roof structure by means of retention wires 34 (a) and 34 (b), which, together, serve to ensure proper axial alignment of the sleeve 30 relative to the catalyst tube 2. Further, one fibrous insulation layer 18 is provided over the tube sheet 16. As in all embodiments of the present invention, the tube sheet 16 is floatable vertically upwardly and downwardly, within a distance dictated by the positioning of limit lug 24 on tube sheet support bracket 22. Of course, sleeve 30, also rides upwardly and downwardly with the floating tube sheet 16, and the proper axial alignment of the sleeve 30 is ensured by the retention wires 34 (a) and 34 (b).

Accordingly, it is apparent that the present invention provides a novel means for providing for the vertical upward and downward movement of vertically oriented tubes, in a furnace, even when those tubes are bent or bowed during operation. Furthermore, it is apparent that the tube sheets in accordance with the invention may readily be repaired or replaced without removal of adjacent tubes and/or their supporting structure. Although this invention has been described with specific reference being made to a catalytic reformer, it is also applicable to any type of furnace wherein tubes are vertically mounted and extend through a portion of the furnace roof structure.

It will be apparent to those skilled in the art that changes may be made in the form of the embodiments disclosed herein without departing from the spirit and scope of the invention set forth in the appended claims, and that in some cases, some features of the invention may be used to advantage without a corresponding use of other features. All such equivalent features are hereby intended to be covered by the scope of the appended claims.

We claim:

1. Furnace apparatus for heating portions of a plurality of individual vertically extending tubes, while permitting vertical expansion and contraction of all said tubes, including any such tubes which become significantly bowed or bent, and preventing significant strain to be placed on said bowed or bent tubes, comprising, in combination, an enclosed fire box having a roof, a plurality of vertically extending tubes being disposed in said fire box, with the upper ends of said tubes extending through said roof, a plurality of openings being formed in said roof to permit extension of the top of said tubes therethrough, floatable fire box cover means surrounding said tubes proximate said openings and permitting vertical expansion and contraction of said tubes, said floatable fire box cover means being floatable vertically upwardly and downwardly through a limited distance, to compensate for upward and downward movement of bowed or bent tubes.

2. Furnace as defined in claim 1 further comprising a floatable tube sheet means bracket attached to said roof and providing a mounting support for said floatable tube sheet means.

3. Furnace as defined in claim 2 wherein said bracket comprises a flange upon which said floatable tube sheet means is adapted to rest.

4. Furnace as defined in claim 1 further comprising limit means operatively associated with said floatable tube sheet means for limiting vertical upward movement thereof.

5. Furnace as defined in claim 1 further comprising a fibrous insulating layer overlying each said floatable tube sheet means.

6. Furnace as defined in claim 1 further comprising a fibrous insulating layer disposed under each said floatable tube sheet means.

7. Furnace as defined in claim 1 further comprising tube insulating means coaxially surrounding said tube above said floatable sheet means and wherein connecting means are provided to connect said tube insulating means to said roof to ensure proper axial alignment of said tube insulating means about said tubes.

8. Furnace as defined in claim 2 wherein said bracket is of a substantially "L" shaped side section and wherein said floatable tube sheet means is adapted to rest on the bottom portion of said "L."

9. Furnace apparatus for heating portions of a plurality of individual vertically extending tubes, while permitting vertical expansion and contraction of all said tubes, including any such tubes which become significantly bowed or bent, and preventing significant strain to be placed on said bowed or bent tubes, comprising, in combination, an enclosed fire box having a roof, a plurality of vertically extending tubes being disposed in said fire box, with the upper ends of said tubes extending through said roof, a plurality of openings being formed in said roof to permit extension of the tops of said tubes therethrough, at least a pair of tube sheet plates, which together surround each said tube proximate one of said openings, each said tube sheet plate being capable of being removed without attendant removal of an adjacent tube.

10. Furnace as defined in claim 9 wherein said tube sheet plates are floatably attached to said roof, said tube sheet plates permitting vertical expansion and contraction of said tubes, said tube sheet plates being floatable vertically upwardly and downwardly through a limited distance.

11. Furnace as defined in claim 10 wherein a floatable tube sheet plate mounting bracket is attached to said roof and provides a mounting support for said tube sheet plate.

12. Furnace as defined in claim 11 wherein said bracket comprises a flange upon which said tube sheet plate is adapted to rest.

13. Furnace as defined in claim 10 further comprising limit means operatively associated with said tube sheet plates for limiting upward vertical movement thereof.

14. Furnace as defined in claim 10 further comprising a fibrous insulating layer overlying each said tube sheet plate.

15. Furnace as defined in claim 10 further comprising a fibrous insulating layer disposed underneath each said tube sheet plate.

16. Furnace as defined in claim 10 further comprising tube insulating means coaxially surrounding said tube above said tube sheet plate and wherein connecting means are provided to connect said tube insulating means to said roof to ensure proper axial alignment of said tube insulating means about said tube.

17. Furnace apparatus for heating portions of a plurality of individual vertically extending tubes, while permitting vertical expansion and contraction of all said tubes, including any such tubes which become significantly bowed or bent, and preventing significant strain to be placed on said bowed or bent tubes, comprising, in combination, an enclosed fire box having a roof, a plurality of vertically extending tubes being disposed in said fire box with the upper ends of said tubes extending through said roof, a plurality of openings being formed in said roof to permit extension of the top of said tubes therethrough, floatable fire box cover means surrounding said tubes proximate said openings and permitting vertical expansion and contraction of said tubes, said floatable fire box cover means being floatable vertically upwardly and downwardly through a limited distance to compensate for upward and downward movement of bowed or bent tubes, wherein said floatable tube sheet means comprise tube sheet plates, at least a pair of said plates surrounding each said tube proximate one of said openings, each said tube sheet plate being capable of being removed without attendant removal of a neighboring tube.

* * * * *